Feb. 17, 1953   C. E. DEARDORFF   2,628,629
FLOW EQUALIZER VALVE
Filed May 3, 1949
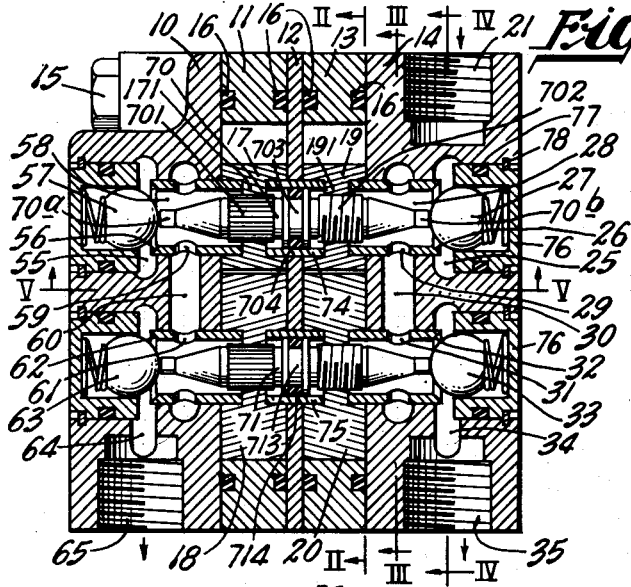
Fig. 1
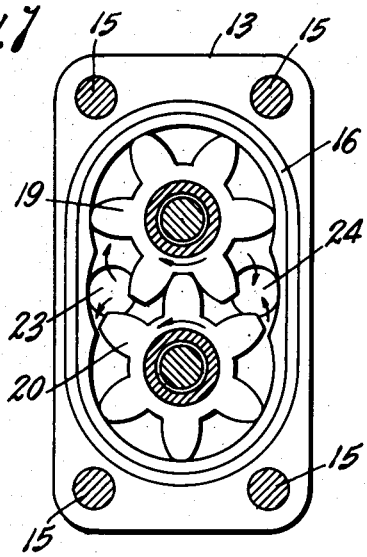
Fig. 2
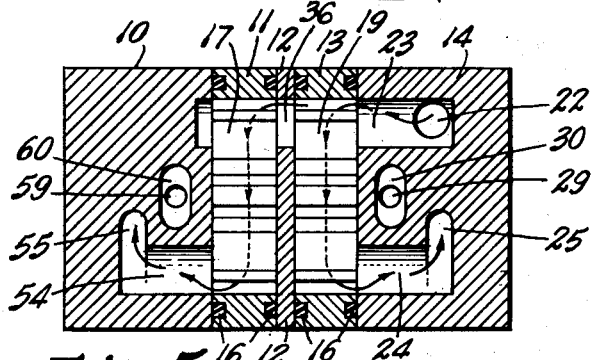
Fig. 5
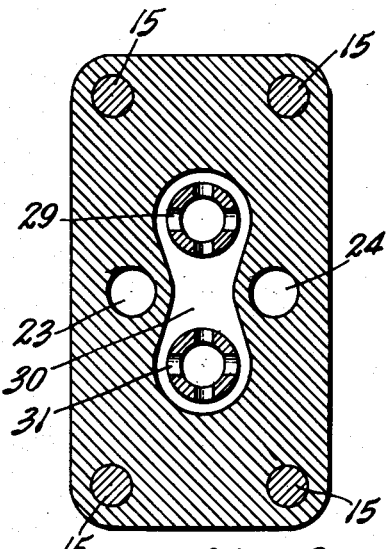
Fig. 3
Fig. 4
INVENTOR
C. E. DEARDORFF
BY E. Woodbury
ATTORNEY Patented Feb. 17, 1953

2,628,629

UNITED STATES PATENT OFFICE 2,628,629

FLOW EQUALIZER VALVE

Clinton E. Deardorff, San Fernando, Calif., assignor to Bendix Aviation Corporation, South Bend, Ind., a corporation of Delaware Application May 3, 1949, Serial No. 91,145

4 Claims. (Cl. 137—99)

This invention relates to hydraulic systems and the like in which it is desired to deliver fluid to two devices in parallel at predetermined relative rates from a common source, irrespective of different resistances to flow in the two devices.

An object of the invention is to provide an effective and inexpensive automatic valve for maintaining flows of predetermined ratio in two parallel paths.

More specific objects and features of the invention will appear from the description thereof to follow.

Flow equalizing valves for producing proportionate fluid flow in two hydraulic motors connected in parallel are old, and have been used extensively in hydraulic systems for the actuation of airplane wing flaps, etc. where it is important that two devices move in unison. Heretofore, two general types of flow proportioning devices have been employed. One type employs a sliding control valve, usually of the shuttle valve type, in which a pressure drop across a fixed restriction in each of the two branch lines is applied to the opposite ends of the shuttle valve. If the flow increases in either line, the pressure drop across the restriction in that line becomes greater than the drop across the restriction in the other line, thereby unbalancing the pressures on opposite ends of the shuttle valve and moving the latter to increasingly throttle the fluid flow in the line of least resistance, and decreasingly throttle the fluid flow through the line of greater resistance. This type of valve is effective if made to very strict tolerances, but becomes expensive to manufacture, for that reason.

The other common type of flow equalizer consists of a pair of fluid motors, one in each line, both of which are mechanically coupled together so that they are forced to turn at the same speed. They will then balance the flow in the two lines within limits determined by the leakage factors of the motors. Gear type motors are commonly employed and they always have some leakage, the amount depending upon the tolerances of manufacture, and effective motors having only slight leakage are relatively expensive. Unless such motors are made to very close tolerances they are not effective when there is a tendency for a large discrepancy in flow in the two branch lines, because the leakage is proportional to the pressure differentials that exist across the two motors.

In accordance with the present invention, certain features of the two prior types of flow equalizers have been combined in such a way as to largely eliminate the expensive features of the prior valves. Thus the present invention employs throttling valves in the two branch lines to variably, inversely, throttle the flows in such a way as to maintain them equal. However, these throttling valves, instead of being actuated by differential pressure on a piston as in the first mentioned prior type, are actuated by gear motors. Furthermore, a large speed reduction is provided between the gear motors and the valve mechanism so that very little torque at the gear motors is sufficient to shift the valve in one direction or the other. The result is that the gear motors offer very little resistance to rotation and corresponding little inducement to leakage. In other words, because of the fact that the gear motors offer little resistance to rotation, the pressure drops thereacross are always very slight, and leakage being a function of the pressure drop, the leakage can be maintained to a small value without extremely accurate fitting. This decreases the cost of manufacture.

A full understanding of the invention may be had from the following description of a particular embodiment of the invention illustrated in the drawing, in which:

Fig. 1 is a horizontal section taken in the median plane;

Figs. 2, 3 and 4 are cross sections taken in the parallel, vertical planes II—II, III—III and IV—IV respectively; and Fig. 5 is a vertical section at right angles to the sections of Figs. 2, 3 and 4, the section plane being indicated at V—V in Fig. 1.

Referring first to Fig. 1, the valve therein disclosed comprises a body made in a plurality of sections 10, 11, 12, 13 and 14, for convenience in manufacture, these sections being held together by four bolts 15 and hydraulically sealed with respect to each other by gaskets 16.

As shown most clearly in Fig. 2, the sections 11 and 13 define gear chambers for four motor gears 17, 18, 19 and 20 respectively. The fluid flow through the body and past the gear motors can be as follows: Fluid may enter a common port 21 (Fig. 1) from which it flows (Fig. 4) through an arcuate passage 22 into a passage 23. The passage 23 (Fig. 5) communicates directly with the gear chamber containing the motor gears 19 and 20, rotating the gear 19 clockwise and the gear 20 counterclockwise (with reference to Fig. 2) and escaping from this compartment into a passage 24 (Fig. 5). From the passage 24 the fluid flows through a passage 25 (Figs. 1 and 4) and thence between a seat 26 and a valve poppet (ball) 27 into a passage 28 and thence through passages 29 into a passage 30. From the passage 30 fluid flows through passages 31 into a seat element 32 and thence between the seat 32 and poppet (ball) 33 into a passage 34 which is directly connected to a branch port 35. Fluid can flow from the common port 21 to another branch port 65 as follows: Part of the fluid from the passage 23 (Fig. 5), passes through the gear chamber containing the gears 19 and 20, and through a passage 36 in the body section 12 into the chamber containing the gears 17 and 18. After rotating those gears, fluid escapes from the gear chamber through a passage 54 into a passage 55 and thence (Fig. 1) between a poppet (ball) 57 and its seat 56 and through passages 59 into a passage 60 from which it in turn flows through openings 61 and thence between a seat 62 and associated poppet (ball) 63 into a passage 64 which is connected directly to the branch port 65.

During flow through the valve from the common port 21 to the branch ports 35 and 65, proportionate flows from the two branch ports is maintained by the relative positions of the valve poppets 27 and 57 with respect to their seats 26 and 56 respectively, the fluid flowing in direction to urge these poppets against their seats, and the poppets being maintained off their seats by the opposite ends 70a and 70b of an actuator 70 which is shifted in one direction or the other whenever differential flow to the two branch ports 35 and 65 causes the motor gears 19 and 20 to rotate at a different speed from the motor gears 17 and 18. During flow from the common port 21 to the branch ports 35 and 65, the flow past the poppets 33 and 63 is in direction to urge the poppets off their seats so that they do not throttle the flow. On the other hand, when the direction of flow is from the branch ports 35 and 65 to the common port 21, the direction of flow past the poppets 33 and 63 is in direction to urge them against their seats and they are effective to throttle the flow differentially under the control of an actuator 71, whereas the poppets 27 and 57 are then ineffective to throttle flow because the direction of flow is such as to carry them off their seats.

The actuator 70 is mounted for rotation with the gear 17 and for free longitudinal motion with respect thereto, but is mounted for rotation with respect to gear 19 and longitudinal movement in response to such relative rotary motion. To this end, the actuator 70 has a splined portion 701 meshing with an internally splined portion 171 on the gear 17, and a screw-threaded portion 702 threaded into an internally threaded portion 191 on the gear 19. Both gears are, of course, prevented from moving axially in either direction by the end walls of the chambers in which they are mounted. So long as the gears 17 and 19 rotate at the same speed, as they will in response to equal flows through the branch ports 35 and 65, no relative displacement occurs between the gear 19 and the actuator 70, and the latter remains in fixed axial position so that the flow conditions remain constant. However, if as the result of increased resistance to flow in the branch line connected to the branch port 35 the rate of flow through the latter port diminishes, the gear 19 will slow down with respect to the gear 17 and the actuator 70. The resultant relative rotation between the thread portion 191 of gear 19 and thread portion 702 of the actuator 70 moves the actuator longitudinally in such direction as to move the poppet 27 away from its seat 26 while permitting the poppet 57 to approach its seat 56.

This motion continues until the increased throttling at the seat 56 and the decreased throttling at the seat 26 compensate for the additional resistance to flow in the branch line connected to the branch port 35, and the flow is again equalized, whereupon the gears 17 and 19 will again rotate at the same speed and maintain the fluid openings at the seats 56 and 26 constant. Obviously, if the external change should be such as to increase the rate of flow from the branch port 35 relative to the branch port 65, the relative motion between the gear 19 and the actuator 70 would be opposite, so as to move the poppet 27 closer to its seat 26 and move the poppet 57 farther away from its seat 56. Since the gear 20 rotates at the same speed as the gear 19, and the gear 18 rotates at the same speed as the gear 17, the actuator 71 will be moved longitudinally simultaneously with the actuator 70, but it will have no effect on the flow so long as the flow is from the common port 21 to the branch ports 35 and 65, because the flow is in direction to lift the poppets off their seats. However, when the flow through the valve is reversed, that is, from the branch ports 65 and 35 to the common port 21, then the poppets 33 and 63 become effective to equalize the flow, and the poppets 27 and 57 become ineffective. The same valve therefore functions reversibly to equalize the flow regardless of the direction of flow therethrough.

To seal the chamber containing the gears 19 20 from the chamber containing the gears 17 and 18, the actuators 70 and 71 are provided with central grooves 703 and 713 respectively containing sealing rings 704 and 714 which seal with the inner surfaces of cylindrical inserts 74 and 75 respectively which bridge the body sections 11, 12 and 13.

Each of the ball poppets 57, 63, 27 and 33 is shown guidingly supported in a hollow plug member 76 which is inserted in a hole provided therefor in the body, sealed with a sealing ring 77, and retained by an expansible ring 78.

An important advantage of the construction described is that the screw connection between the gear 19 and the actuator 70, and between the gear 20 and the actuator 71 provides a large speed reduction, greatly multiplying the force developed in the actuators in response to a given torque in the gears 19 or 20. The result is that irrespective of differences in flow through the two branch ports which causes the gears to operate at different speeds to actuate the valve mechanism, the relative resistance to rotation of the two gear motors is always very slight so that there is very little tendency for unequal leakage past the motor gears 19 and 20 as compared to the leakage past the motor gears 17 and 18. Hence the gear motors can be made to relatively coarse tolerances as compared to those that would be required in constructing two gear motors positively mechanically connected together, as in one mentioned type of prior art flow equalizer. In this prior type referred to, a slight difference in flow through the two branch ports produces a very substantial pressure differential across one gear motor in one direction, and across the other gear motor in the opposite direction, thereby urging fluid to leak forwardly past one gear motor, and rearwardly past the other gear motor. Actually the motor tending to run faster drives the other motor as a pump. In the present motor there is never sufficient difference in torque between the two motors to produce opposite leakage therethrough, all the compensation being made by adjustment of the valve poppets 27 and 57 or 33 and 63 in response to the freely permitted differential motion of the two gear motors.

Although for the purpose of explaining the invention a particular embodiment thereof has been shown and described, obvious modifications will occur to a person skilled in the art, and I do not desire to be limited to the exact details shown and described.

I claim:

1. A motion-producing mechanism comprising: a pair of rotary fluid motors, the speeds of which are proportional to the rates of fluid flow therethrough; a control member; and means differentially responsive to the motions of said two fluid motors for moving said control member a distance proportional to the total differential movements of said two motors, in which said two motors have aligned axes of rotation coaxial with the path of movement of said control member, and said differentially responsive means comprises: means for coupling said control member to one of said motors for rotation therewith; and screw means intercoupling said control member and the other motor for effecting axial movement of said control member in response to a difference in the rotative speeds of said two motors.

2. A mechanism according to claim 1 in which said fluid motors are gear motors, each comprising a pair of intermeshing gears, with one gear of one motor in axial alinement with one gear of the other motor, one of said axially alined gears having a threaded axial aperture, and the other having a splined axial aperture; said control member comprising an axial member extending through said apertures and having a threaded portion engaging the threaded axial aperture of the one gear, and a splined portion engaging the splined axial aperture of the other gear.

3. A mechanism according to claim 2 in which the other gears of said two motors are in alignment with each other, one of said other gears has a threaded axial aperture and the other has a splined axial aperture; a second control member comprising an axial member extending through said apertures in said other gears and having a threaded portion engaging the threaded axial aperture of one gear and a splined portion engaging the splined axial aperture of the other gear; first and second poppet valves each comprising a seat and a poppet movable toward and away from the seat, said poppets being in the paths of movement of said respective control members whereby movement thereof varies the spacing of the poppets from the seats; and conduit means including said two poppet valves in series opposed relation whereby one or the other of said poppets is urged toward its seat by fluid flow through said conduit means irrespective of the direction of flow.

4. A mechanism according to claim 1 including a poppet valve comprising a seat and a poppet movable toward and away from the seat, said poppet being in the path of the movement of said control member whereby movement thereof varies the spacing of the poppet from the seat.

CLINTON E. DEARDORFF.

REFERENCES CITED

The following references are of record in the file of this patent:

UNITED STATES PATENTS

| Number | Name | Date |
|---|---|---|
| 1,747,536 | Aernout | Feb. 18, 1930 |
| 1,999,834 | Ernst | Apr. 30, 1935 |
| 2,252,369 | Germer | Aug. 12, 1941 |
| 2,466,485 | Schultz | Apr. 5, 1947 |

FOREIGN PATENTS

| Number | Country | Date |
|---|---|---|
| 460,161 | Great Britain | Jan. 22, 1937 |